United States Patent
Park et al.

(10) Patent No.: US 12,021,553 B2
(45) Date of Patent: **\*Jun. 25, 2024**

(54) ELECTRONIC DEVICE FOR MATCHING ANTENNA IMPEDANCE AND OPERATING METHOD THEREOF

(71) Applicant: Samsung Electronics Co., Ltd., Suwon-si (KR)

(72) Inventors: Jongho Park, Suwon-si (KR); Yongbin Yoon, Suwon-si (KR); Hyunsoo Kim, Suwon-si (KR); Youngjun Park, Suwon-si (KR); Hyangbok Lee, Suwon-si (KR); Hyungjoon Yu, Suwon-si (KR); Youngkwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

This patent is subject to a terminal disclaimer.

(21) Appl. No.: 17/532,971

(22) Filed: Nov. 22, 2021

(65) Prior Publication Data

US 2022/0085835 A1 Mar. 17, 2022

Related U.S. Application Data

(63) Continuation of application No. 17/030,288, filed on Sep. 23, 2020, now Pat. No. 11,184,040.

(30) Foreign Application Priority Data

Sep. 23, 2019 (KR) .................. 10-2019-0117078

(51) Int. Cl.
*H04B 1/04* (2006.01)
*H04B 17/10* (2015.01)

(52) U.S. Cl.
CPC ......... *H04B 1/0458* (2013.01); *H04B 17/102* (2015.01)

(58) Field of Classification Search
CPC ............... H04B 1/04; H04B 1/0458; H04B 2001/0408; H04B 17/10; H04B 17/101; H04B 17/102
See application file for complete search history.

(56) References Cited

U.S. PATENT DOCUMENTS 5,563,616 A * 10/1996 Dempsey ............... H01Q 9/285
                                                                343/756
8,508,423 B2 * 8/2013 Suetsuna ............... H01Q 9/285
                                                                343/700 MS (Continued)

FOREIGN PATENT DOCUMENTS

JP 2006013431 A 1/2006

OTHER PUBLICATIONS

Office Action dated Oct. 19, 2023, in connection with Korean Patent Application No. 10-2019-0117078, 4 pages.

*Primary Examiner* — Quochien B Vuong

(57) ABSTRACT

Various embodiments of an electronic device for matching an antenna impedance may include an antenna, a wireless communication module, an impedance matching module, and at least one processor, wherein the at least one processor is configured to: select a first index corresponding to an impedance of the antenna among a plurality of sampled indexes through a first measurement in which a tuning code of the impedance matching module is configured as a reference code; identify a use environment corresponding to the first index; select a second index corresponding to the impedance of the antenna among the plurality of sampled indexes through a second measurement in which the tuning code of the impedance matching module is configured as the reference code and as a ground code corresponding to the (Continued)

use environment; and adjust the impedance of the antenna based on a tuning code corresponding to the second index.

20 Claims, 13 Drawing Sheets

(56) References Cited

U.S. PATENT DOCUMENTS

| | | | |
|---|---|---|---|
| 8,744,418 B2* | 6/2014 | Novet | H04M 1/72454 455/67.11 |
| 9,774,362 B1 | 9/2017 | Sammeta et al. | |
| 2007/0093050 A1 | 4/2007 | Son et al. | |
| 2007/0194859 A1 | 8/2007 | Brobston et al. | |
| 2017/0194712 A1* | 7/2017 | Skiftesvik | H04B 17/12 |
| 2018/0026369 A1 | 1/2018 | Kim et al. | |

* cited by examiner

ELECTRONIC DEVICE FOR MATCHING ANTENNA IMPEDANCE AND OPERATING METHOD THEREOF

CROSS-REFERENCE TO RELATED APPLICATION

This application is a continuation of U.S. patent application Ser. No. 17/030,288 filed on Sep. 23, 2020, which is based on and claims priority under 35 U.S.C. § 119 to Korean Patent Application No. 10-2019-0117078 filed on Sep. 23, 2019 in the Korean Intellectual Property Office, the disclosures of which are herein incorporated by reference in their entirety.

BACKGROUND

1. Field

Various embodiments of the disclosure relate to an apparatus and a method for matching antenna impedance in an electronic device.

2. Description of Related Art

An electronic device may perform a wireless communication with an external electronic device using at least one antenna. Impedance of an antenna may exert an influence on a transmission efficiency of the antenna for wireless communication. For example, in an electronic device, a loss (e.g., reflection loss), which is caused by at least a part of a transmission signal being reflected without being emitted, may occur due to a difference in impedance between an antenna and a front end unit (FEU) that transmits a signal to the antenna.

In order to increase the transmission efficiency of the antenna, the electronic device may match the impedance of the antenna. For example, the impedance matching may mean an operation capable of performing a maximum power transfer transmission to an antenna by matching the impedance of the antenna, which is changed in accordance with various propagation environments or use environments of the electronic device, with the characteristic impedance.

SUMMARY

An electronic device may perform an antenna impedance matching by applying a tuning code corresponding to the impedance of the antenna. For example, the tuning code corresponding to the impedance of the antenna may include a tuning code corresponding to any one index closest to the impedance of the antenna among a plurality (e.g., 25) of sampled indexes.

However, in case of selecting the tuning code corresponding to the impedance of the antenna, configuration of a ground controlling the length of the antenna is excluded, and thus there may be a problem that the electronic device is unable to select the optimum tuning code that can match the antenna impedance with the characteristic impedance.

Various embodiments of the disclosure disclose an apparatus and a method for selecting an optimum tuning code for matching the antenna impedance in an electronic device.

According to various embodiments of the disclosure, an electronic device may include: an antenna; a wireless communication module; an impedance matching module electrically connected to the antenna and the wireless communication module; and at least one processor operatively connected to the impedance matching module and the wireless communication module, wherein the at least one processor is configured to: select a first index corresponding to an impedance of the antenna among a plurality of sampled indexes through a first measurement in which a tuning code of the impedance matching module is configured as a reference code, identify a use environment corresponding to the first index, select a second index corresponding to the impedance of the antenna among the plurality of sampled indexes through a second measurement in which the tuning code of the impedance matching module is configured as the reference code and as a ground code corresponding to the use environment, and adjust the impedance of the antenna based on a tuning code corresponding to the second index.

According to various embodiments of the disclosure, an electronic device may include: an antenna; a wireless communication module; an impedance matching module electrically connected to the antenna and the wireless communication module; and at least one processor operatively connected to the impedance matching module and the wireless communication module, wherein the at least one processor is configured to: select a first index corresponding to a first impedance of the antenna identified through a first measurement, in which a tuning code of the impedance matching module is configured as a reference code, among a plurality of sampled indexes, identify a use environment corresponding to the first index, identify a second impedance of the antenna through a second measurement in which the tuning code of the impedance matching module is configured as a tuning code corresponding to the first index and as a ground code corresponding to the use environment, and adjust the impedance of the antenna based on the tuning code corresponding to the first index in case that a distance between the second impedance and a reference impedance satisfies a designated condition.

According to various embodiments of the disclosure, a method for operating an electronic device may include: selecting a first index corresponding to an impedance of an antenna among a plurality of sampled indexes through a first measurement in which a tuning code for impedance matching of the antenna is configured as a reference code; identifying a use environment corresponding to the first index; selecting a second index corresponding to the impedance of the antenna among the plurality of sampled indexes through a second measurement in which the tuning code for the impedance matching of the antenna is configured as the reference code and as a ground code corresponding to the use environment; and adjusting the impedance of the antenna based on a tuning code corresponding to the second index.

According to various embodiments of the disclosure, a method for operating an electronic device may include: selecting a first index corresponding to a first impedance of an antenna identified through a first measurement, in which a tuning code for impedance matching of the antenna is configured as a reference code, among a plurality of sampled indexes; identifying a use environment corresponding to the first index; identifying a second impedance of the antenna through a second measurement in which the tuning code for the impedance matching of the antenna is configured as a tuning code corresponding to the first index and as a ground code corresponding to the use environment; and adjusting the impedance of the antenna based on the tuning code corresponding to the first index in case that a distance between the second impedance and a reference impedance satisfies a designated condition.

Effects that can be obtained in the disclosure are not limited to the above-described effects, and other unmentioned effects can be clearly understood by those of ordinary skill in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in detail with reference to the accompanying drawings.

Figure 1:
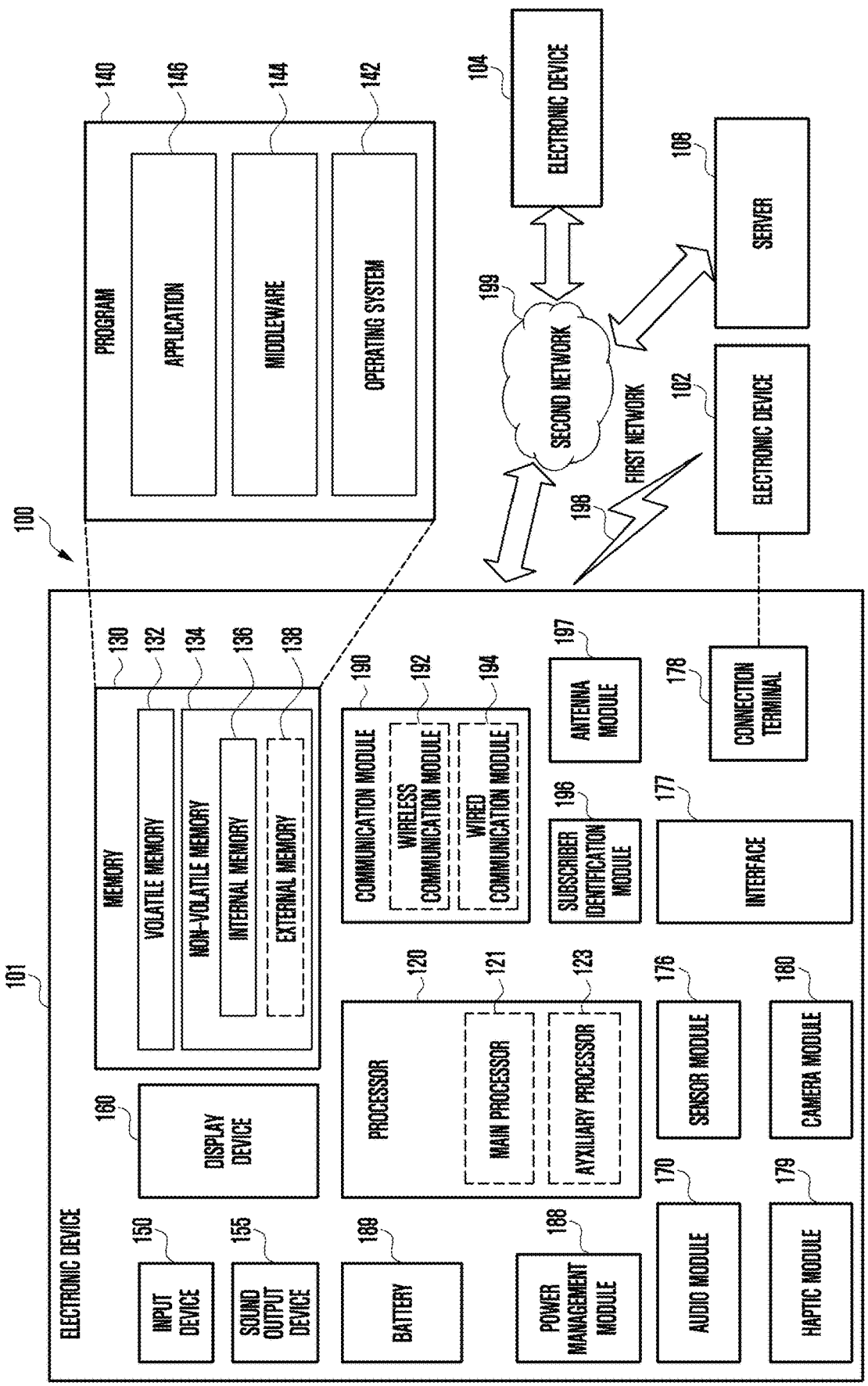
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Figure 2:
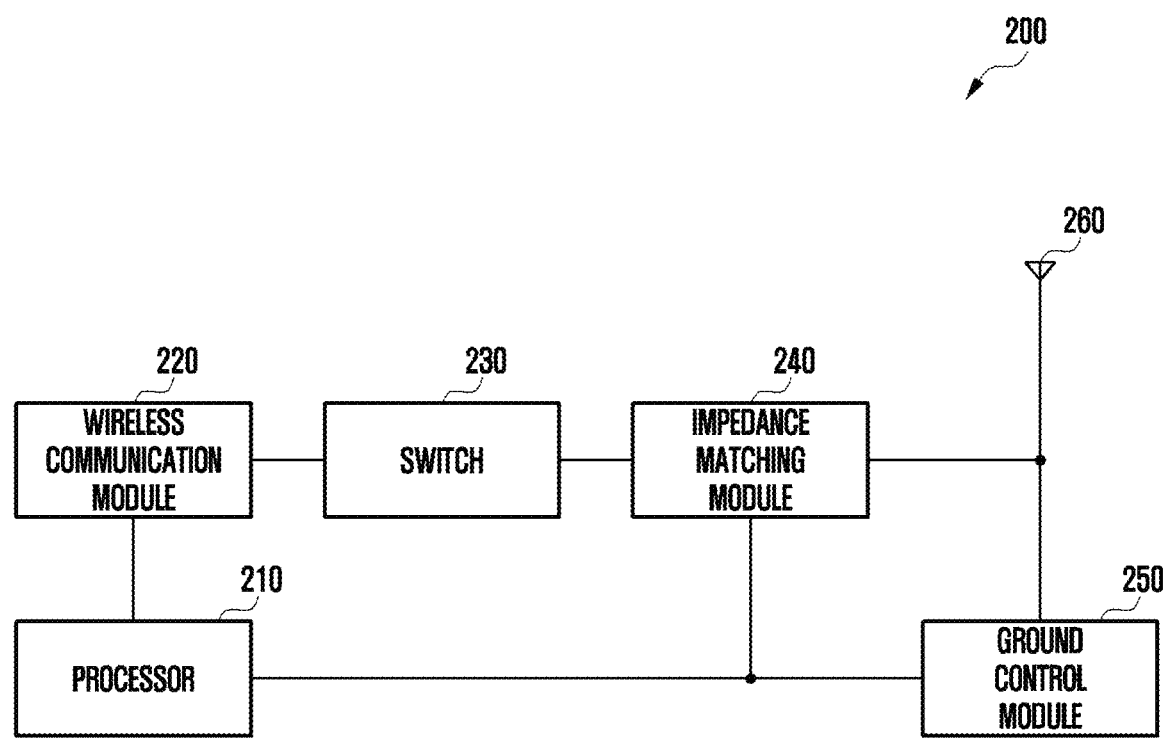
FIG. 2 is a block diagram of an electronic device for matching an antenna impedance according to various embodiments.
Figure 3A:
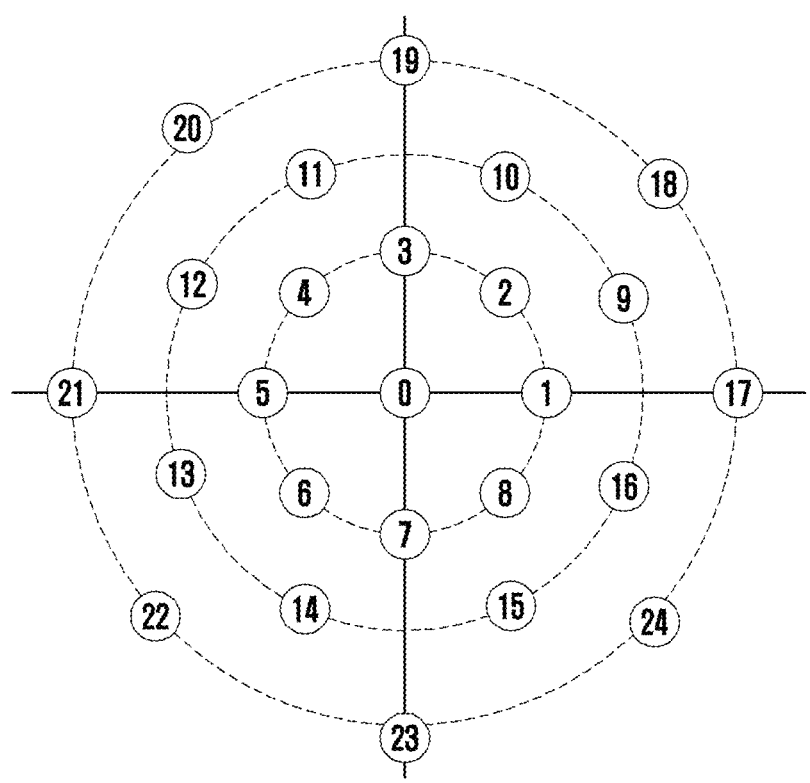
FIG. 3A is a graph illustrating 25 sampled indexes corresponding to an antenna impedance according to various embodiments.
Figure 3B:
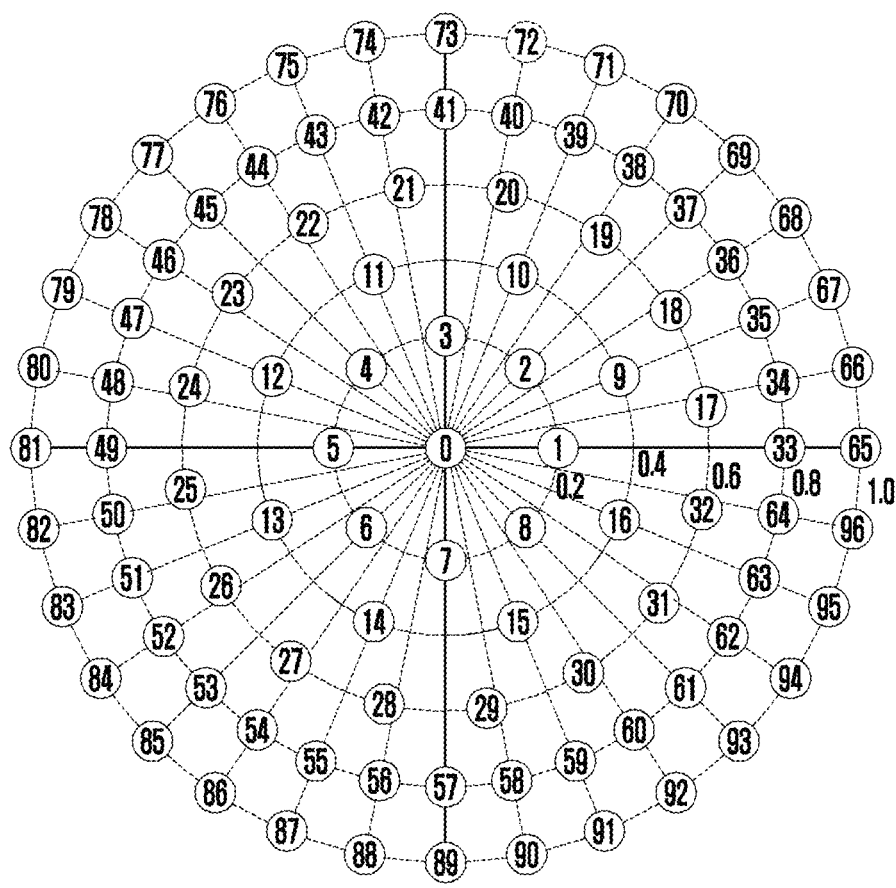
FIG. 3B is a graph illustrating 96 sampled indexes corresponding to an antenna impedance according to various embodiments.
Figure 4:
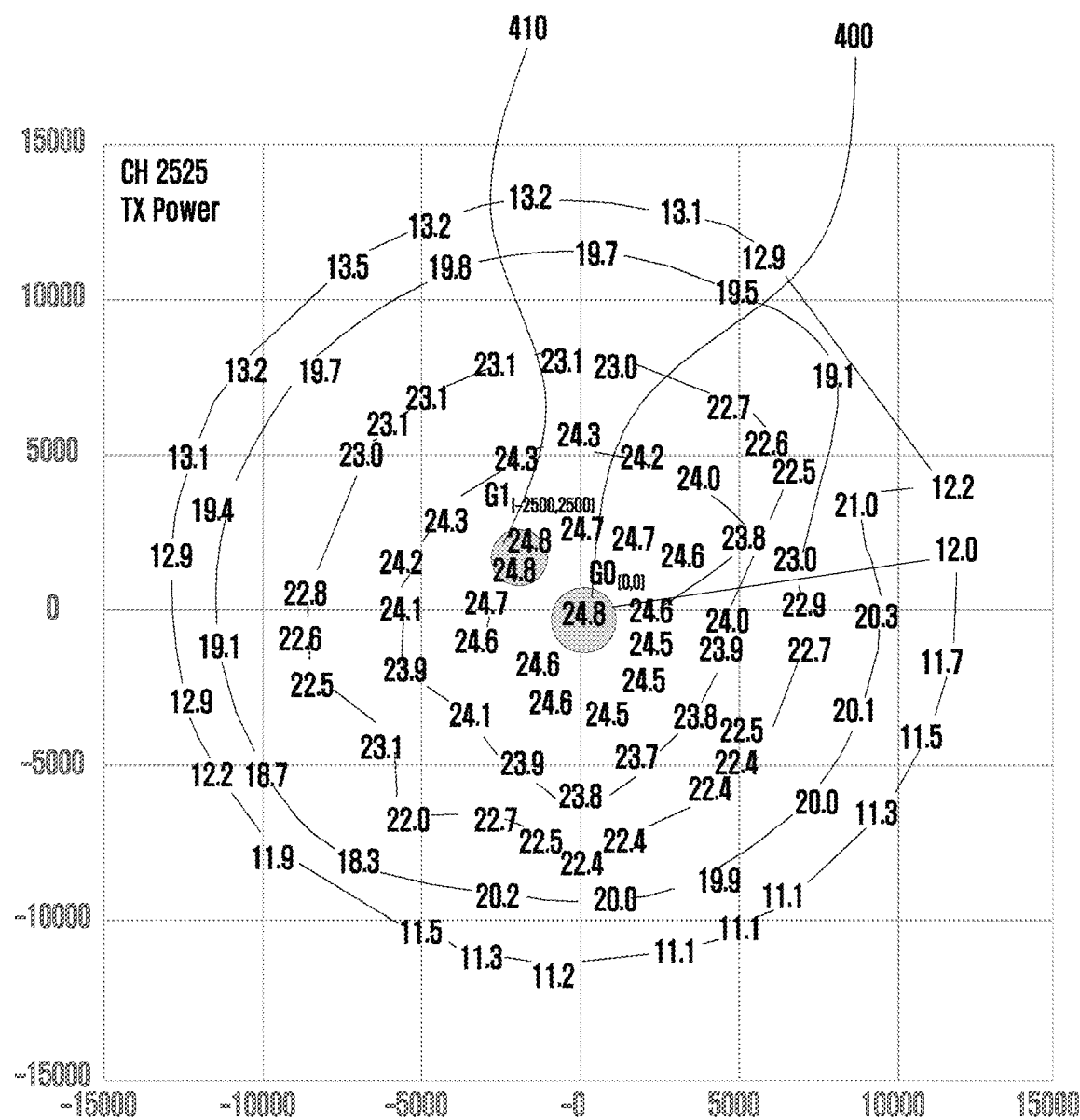
FIG. 4 is a graph illustrating a reference impedance according to various embodiments.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added FIG. 2 is a block diagram of an electronic device 200 for matching antenna impedance according to various embodiments. Hereinafter, at least parts of the configuration of FIG. 2 will be described with reference to FIG. 3A, 3B, or 4. FIG. 3A is a graph illustrating 25 sampled indexes corresponding to an antenna impedance according to various embodiments. FIG. 3B is a graph illustrating 96 sampled indexes corresponding to an antenna impedance according to various embodiments. FIG. 4 is a graph illustrating a reference impedance according to various embodiments.

With reference to FIG. 2, an electronic device 200 may include a processor (e.g., including processing circuitry) 210, a wireless communication module (e.g., wireless communication circuitry) 220, a switch 230, an impedance matching module (e.g., impedance matching circuitry) 240, a ground control module (e.g., ground control circuitry) 250, and at least one antenna 260. According to an embodiment, the processor 210 may be substantially the same as the processor 120 of FIG. 1, or may be included in the processor 120. The wireless communication module 220 may be substantially the same as the wireless communication module 192 of FIG. 1, or may be included in the wireless communication module 192. At least one of the switch 230, the impedance matching module 240, or the ground control module 250 may be included in the wireless communication module 192.

According to various embodiments, the processor 210 may be electrically (or operatively) connected to other constituent elements (e.g., the wireless communication module 220, the switch 230, the impedance matching module 240, or the ground control module 250) to control the constituent elements, and may perform processing and operating of various kinds of data.

According to various embodiments, the processor 210 may select a tuning code of the impedance matching module 240 based on ground configuration corresponding to a use environment of the electronic device 200. As an example, the tuning code of the impedance matching module 240 may indicate a tuning code for matching an impedance of the antenna 260 with a reference impedance.

According to an embodiment, the processor 210 may identify the antenna impedance of the electronic device 200 through a first measurement configuring the tuning code of the impedance matching module 240 as a reference code (e.g., bypass code). The processor 210 may estimate a use environment of the electronic device 200 based on an index corresponding to the antenna impedance identified through the first measurement. As an example, the index corresponding to the antenna impedance may include any one index having the shortest distance to the coordinates of the antenna impedance identified through the first measurement among 25 sampled indexes as shown in FIG. 3A or 96 sampled indexes as shown in FIG. 3B. The processor 210 may select a tuning code to be applied to the impedance matching module 240 through a second measurement to which a ground code corresponding to the use environment of the electronic device 200 is applied. As an example, the tuning code to be applied to the impedance matching module 240 may include a tuning code corresponding to any one index having the closest distance to the coordinates of the antenna impedance obtained through the second measurement among the 25 sampled indexes as shown in FIG. 3A or the 96 sampled indexes as shown in FIG. 3B. As an example, the tuning code of the impedance matching module 240 may be configured as the reference code during the second measurement. As an example, the processor 210 may select (or update) the tuning code based on the second measurement in a state where the index obtained through the first measurement is equally maintained. As an example, the processor 210 may include a communication processor (CP) or an application processor (AP).

According to an embodiment, the processor 210 may perform the first measurement for identifying an impedance change of the antenna 260 of the electronic device 200. As an example, during the first measurement, the tuning code of the impedance matching module 240 may be configured as the reference code (e.g., bypass code). The processor 210 may detect the index corresponding to the antenna impedance identified through the first measurement, and may identify the tuning code and the ground code corresponding to the detected index. Through the second measurement based on the result of the first measurement, the processor 210 may determine whether to use the tuning code and the ground code identified through the first measurement. As an example, the second measurement based on the result of the first measurement may include a measuring method for identifying the impedance of the antenna 260 in a state where the impedance matching module 240 and the ground control module 250 are configured by the tuning code and the ground code identified through the first measurement. As an example, whether to use the tuning code and the ground code identified through the first measurement may be determined based on a distance between coordinates of the antenna impedance identified through the second measurement based on the result of the first measurement and coordinates of at least one reference impedance. For example, if it is determined that the processor 210 uses the tuning code and the ground code identified through the first measurement, the processor 210 may control the impedance matching module 240 and/or the ground control module 250 so as to match the antenna impedance based on the tuning code and the ground code identified through the first measurement. As another example, if it is determined that the processor 210 does not use the tuning code and the ground code identified through the first measurement, the processor 210 may update at least one of the tuning code or the ground code through additional second measurement. As an example, the additional second measurement may include a configuration to identify the antenna impedance in a state where the tuning code of the impedance matching module 240 is configured as the reference code and the ground code of the ground control module 250 is configured as the ground code corresponding to the first index. As an example, the additional second measurement may be performed in case that the index obtained through the first measurement is equally maintained.

According to various embodiments, the processor 210 may configure a plurality of reference impedances (e.g., two reference impedances) for matching the antenna impedance by applying the tuning code to the impedance matching module 240. According to an embodiment, the processor 210 may configure G0 coordinates 400 corresponding to 50 ohms and G1 coordinates 410 at which the highest transmission power (e.g., 24.8 dBm) is measured as reference impedances as shown in FIG. 4. As an example, the transmission power corresponding to each index may be measured based on the switch 230. As an example, the plural reference impedances may be used as references for matching the antenna impedance, or may be used as a reference for selecting the tuning code of the impedance matching module 240.

According to various embodiments, the wireless communication module 220 may include a transceiver, an amplification module, and a front end module (FEM). According to an embodiment, the transceiver may convert data provided from the processor 210 (e.g., communication processor) into an RF signal (e.g., transmission (Tx) signal), and may output the RF signal to the front end module (FEM) through the amplification module. Further, the transceiver may convert the RF signal (e.g., reception (Rx) signal) received from the front end module (FEM) into digital data that can be deciphered by the processor 210, and may transfer the digital data to the processor 210. According to an embodiment, the amplification module may include a power amplifier and a low-noise amplifier. The power amplifier may amplify the power of the RF signal (e.g., Tx signal) being provided from the transceiver, and may transmit the amplified power to the front end module (FEM). The low-noise amplifier may amplify the power of the RF signal (e.g., Rx signal) provided from the front end module (FEM) while minimizing the noise of the RF signal, and may transmit the RF signal to the transceiver. According to an embodiment, the front end module (FEM) may include a duplexer and/or a diplexer, and may separately output the transmission and reception signals. As an example, the front end module (FEM) may output the RF signal (e.g., Tx signal) provided from the transceiver through an input port to the antenna 260 through input/output ports, and may output the RF signal (e.g., Rx signal) provided from the antenna 260 through the input/output ports to the transceiver through the output port.

According to various embodiments, the switch 230 may connect the wireless communication module 220 to at least one antenna 260. According to an embodiment, the switch 230 may connect the antenna 260 to be used for the wireless communication among the at least one antenna 260 to the wireless communication module 220.

According to various embodiments, the impedance matching module 240 may adjust the impedance of the antenna 260 to be close to the at least one reference impedance based on the tuning code selected by the processor 210. As an example, the impedance matching module 240 may include at least one of a resistor, an inductor, or a capacitor. For example, the impedance matching module 240 may reduce reflection due to a difference in impedance between the antenna 260 and the wireless communication module 220 by adjusting an electrical length (e.g., capacitor, inductor, or resistor) between the antenna 260 and the wireless communication module 220 based on the tuning code.

According to various embodiments, the ground control module 250 may change a resonance frequency by adjusting the electrical length between the antenna 260 and the ground based on the ground code selected by the processor 210. The ground control module 250 may reduce the reflection occurring due to the impedance difference between the antenna 260 and the wireless communication module 220 through the change of the resonance frequency. As an example, the ground code may be selected based on the first measurement or the additional second measurement.

According to various embodiments, an electronic device (e.g., electronic device 101 of FIG. 1 or electronic device 200 of FIG. 2) may include an antenna (e.g., antenna 260 of FIG. 2), a wireless communication module (e.g., wireless communication module 220 of FIG. 2), an impedance matching module (e.g., impedance matching module 240 of FIG. 2) electrically connected to the antenna and the wireless communication module, and at least one processor (e.g., processor 210 of FIG. 2) operatively connected to the impedance matching module and the wireless communication module, wherein the at least one processor may be configured to: select a first index corresponding to an impedance of the antenna among a plurality of sampled indexes through a first measurement in which a tuning code of the impedance matching module is configured as a reference code, identify a use environment corresponding to the first index, select a second index corresponding to the impedance of the antenna among the plurality of sampled indexes through a second measurement in which the tuning code of the impedance matching module is configured as the reference code and as a ground code corresponding to the use environment, and adjust the impedance of the antenna based on a tuning code corresponding to the second index.

According to various embodiments, the plurality of sampled indexes may include 96 indexes corresponding to different impedances.

According to various embodiments, at least one adjacent index of the plurality of sampled indexes may be grouped by use environments.

According to various embodiments, the at least one processor may be configured to identify the impedance of the antenna through the first measurement and the second measurement in the same period.

According to various embodiments, the at least one processor may be configured to adjust a length of a ground connected to the antenna based on the ground code corresponding to the use environment.

According to various embodiments, an electronic device (e.g., electronic device 101 of FIG. 1 or electronic device 200 of FIG. 2) may include an antenna (e.g., antenna 260 of FIG. 2), a wireless communication module (e.g., wireless communication module 220 of FIG. 2), an impedance matching module (e.g., impedance matching module 240 of FIG. 2) electrically connected to the antenna and the wireless communication module, and at least one processor (e.g., processor 210 of FIG. 2) operatively connected to the impedance matching module and the wireless communication module, wherein the at least one processor may be configured to: select a first index corresponding to a first impedance of the antenna identified through a first measurement, in which a tuning code of the impedance matching module is configured as a reference code, among a plurality of sampled indexes, identify a use environment corresponding to the first index, identify a second impedance of the antenna through a second measurement in which the tuning code of the impedance matching module is configured as a tuning code corresponding to the first index and as a ground code corresponding to the use environment, and adjust the impedance of the antenna based on the tuning code corresponding to the first index in case that a distance between the second impedance and a reference impedance satisfies a designated condition.

According to various embodiments, the plurality of sampled indexes may include 96 indexes corresponding to different impedances, and at least one adjacent index may be grouped by use environments.

According to various embodiments, the at least one processor may be configured to: update the tuning code based on a result of the second measurement in which the tuning code of the impedance matching module is configured as the reference code and as the ground code corresponding to the use environment in case that the distance between the second impedance and the reference impedance does not satisfy the designated condition, and adjust the impedance of the antenna based on the updated tuning code.

According to various embodiments, the at least one processor may be configured to adjust a length of a ground connected to the antenna based on the ground code corresponding to the use environment.

According to various embodiments, the reference impedance may include at least one of inphase (I)/quadrature (Q) information corresponding to 50 ohms or I/Q information having the highest transmission power.

Figure 5:
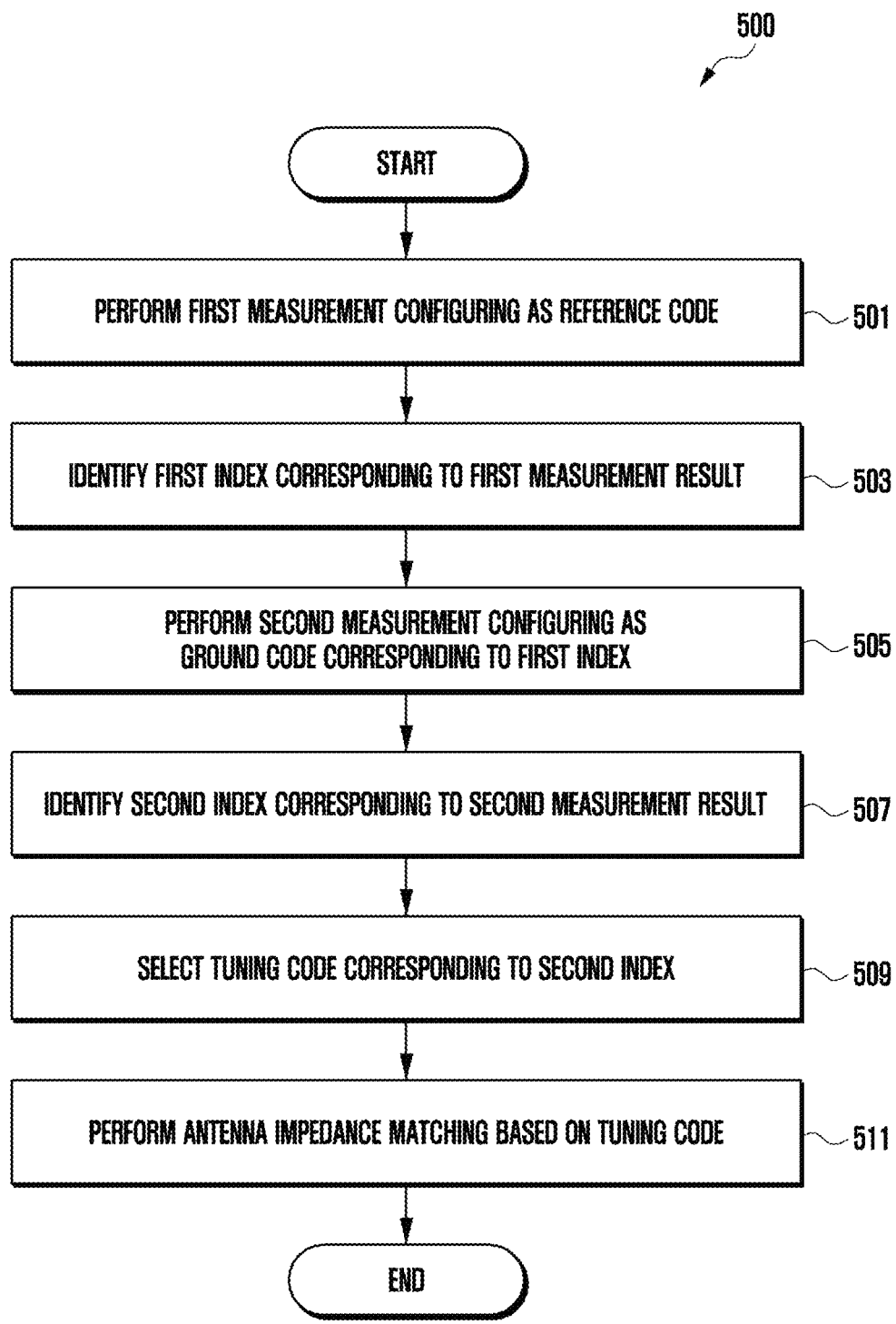
FIG. 5 is a flowchart in which an electronic device according to various embodiments matches an antenna impedance.
Figure 6:
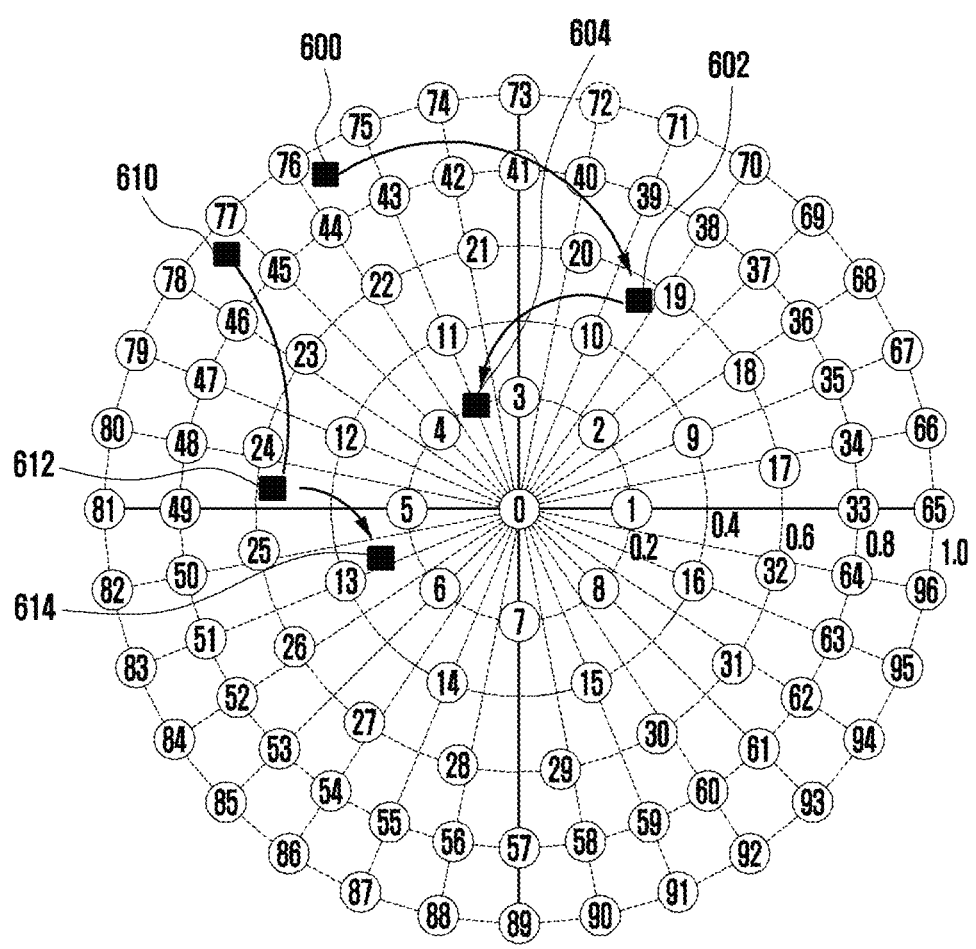
FIG. 6 is a graph for selecting a tuning code according to various embodiments.
Figure 7:
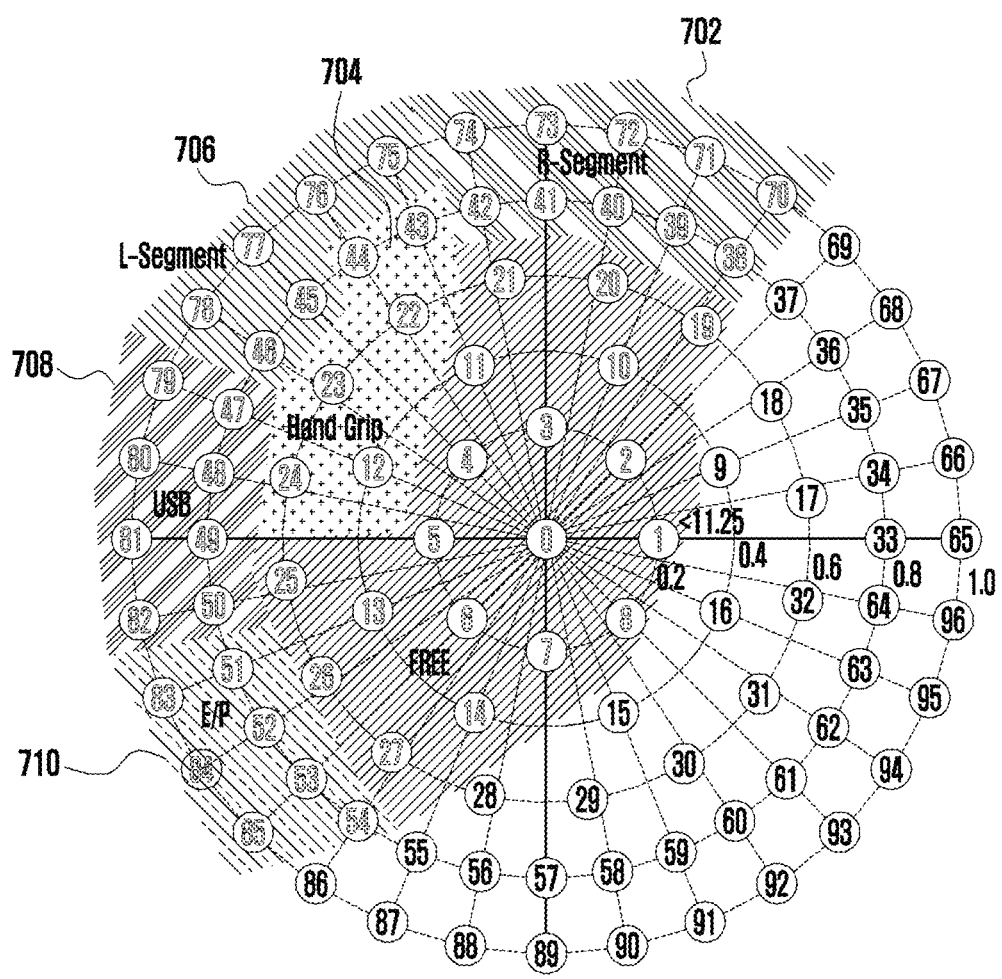
FIG. 7 is a graph illustrating a use environment of an electronic device according to various embodiments.
Figure 8:
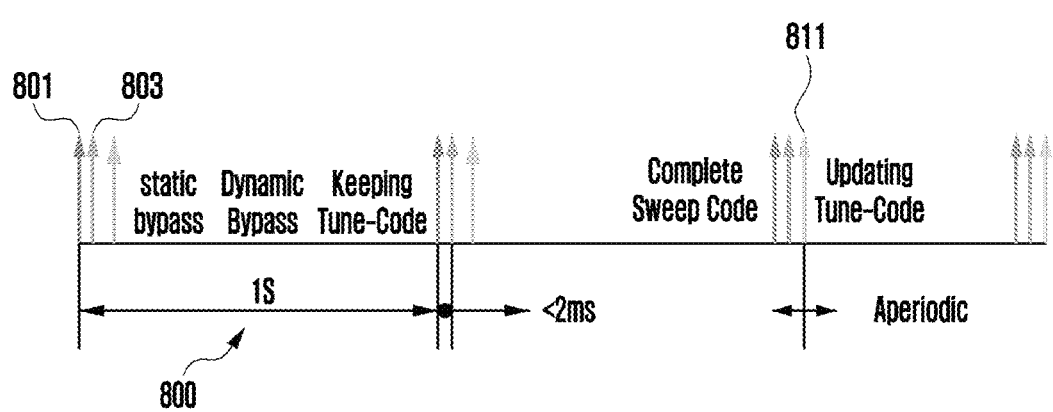
FIG. 8 is a diagram illustrating a period for measuring an antenna impedance according to various embodiments.

FIG. 5 is a flowchart 500 in which an electronic device according to various embodiments matches an antenna impedance. In the following embodiments, respective operations may be sequentially performed, but it may not be necessary that the operations are sequentially performed. For example, the order of the respective operations may be changed, or at least two of the operations may be performed in parallel. Here, the electronic device may be the electronic device 101 of FIG. 1 or the electronic device 200 of FIG. 2. Hereinafter, at least parts of the operations of FIG. 5 will be described with reference to FIG. 6, 7, or 8. FIG. 6 is a graph for selecting a tuning code according to various embodiments. FIG. 7 is a graph illustrating a use environment of an electronic device according to various embodiments. FIG. 8 is a diagram illustrating a period for measuring an antenna impedance according to various embodiments.

With reference to FIG. 5, according to various embodiments, at operation 501, an electronic device (e.g., processor 120 of FIG. 1 or processor 210 of FIG. 2) may perform a first measurement in which a tuning code of an impedance matching module is configured as a reference code to identify an impedance change of an antenna. According to an embodiment, the processor 210 may perform the first measurement in a state where the tuning code of the impedance matching module 240 is configured as the reference code (e.g., bypass code).

According to various embodiments, at operation 503, the electronic device (e.g., processor 120 or 210) may identify a first index corresponding to the result of the first measurement. According to an embodiment, if an antenna impedance 600 is identified through the first measurement as shown in FIG. 6, the processor 210 may select index 76 that is closest to the antenna impedance 600 among 96 sampled indexes. According to an embodiment, if an antenna impedance 610 is identified through the first measurement as shown in FIG. 6, the processor 210 may select index 77 having the shortest distance to the antenna impedance 610 among the 96 sampled indexes.

According to various embodiments, at operation 505, the electronic device (e.g., processor 120 or 210) may perform a second measurement based on the ground code corresponding to the first index. According to an embodiment, as shown in FIG. 7, 96 sampled indexes may be divided into a plurality of areas 702, 704, 706, 708, and 710 corresponding to use environments. For each area 702, 704, 706, 708, or 710, at least one ground code (or range) corresponding to the use environment and a priority may be defined. As an example, the user environment may include at least one of a right-side contact state (R-segment) 702, a hand grip state 704, a left-side contact state (L-segment) 706, a universal serial bus (USB) insertion state 708, or an earphone (E/P) insertion state 710. According to an embodiment, the processor 210 may perform the second measurement in a state where the code of the ground control module 250 is configured as the ground code corresponding to the first index. As an example, the ground code corresponding to the first index may include a ground code having the highest priority among at least one ground code defined in the use environment including the first index. As an example, during the second measurement, the tuning code of the impedance matching module 240 may be configured as the reference code in the same manner as the first measurement.

According to various embodiments, at operation 507, the electronic device (e.g., processor 120 or 210) may identify the second index corresponding to the result of the second measurement. According to an embodiment, if the antenna impedance 602 is identified through the second measurement as shown in FIG. 6, the processor 210 may select index 19 that is closest to the antenna impedance 602 among the 96 sampled indexes. According to an embodiment, if the antenna impedance 612 is identified through the second measurement as shown in FIG. 6, the processor 210 may select index 24 having the shortest distance to the antenna impedance 612 among the 96 sampled indexes.

According to various embodiments, at operation 509, the electronic device (e.g., processor 120 or 210) may select a tuning code corresponding to the second index. According to an embodiment, the 96 sampled indexes defined as shown in FIG. 3B may include predefined tuning codes corresponding to the respective indexes. Accordingly, the processor 210 may identify the predefined tuning code in the index (e.g., index 19 or index 24 of FIG. 6) corresponding to the result of the second measurement.

According to various embodiments, at operation 511, the electronic device (e.g., processor 120 or 210 and/or impedance matching module 240) may adjust the antenna impedance based on the tuning code corresponding to the second index for matching of the antenna impedance. According to an embodiment, the impedance matching module 240 may adjust an electrical length between the antenna 260 and the wireless communication module 220 so that the antenna impedance matches the reference impedance based on the tuning code corresponding to the second index selected by the processor 210. As an example, the impedance matching module 240 may adjust the antenna impedance so that the antenna impedance becomes close to the reference impedance based on the tuning code corresponding to index 19 obtained through the second measurement as shown in FIG. 6 (604). As an example, the impedance matching module 240 may adjust the antenna impedance so that the antenna impedance becomes close to the reference impedance based on the tuning code corresponding to index 24 obtained through the second measurement as shown in FIG. 6 (614). According to an embodiment, the ground control module 250 may adjust the electrical length between the antenna 260 and the ground based on the ground code corresponding to the first index selected by the processor 210.

According to various embodiments, the electronic device (e.g., processor 120 or 210) may identify the antenna impedance through the first measurement 801 and the second measurement 803 in one period 800 as shown in FIG. 8. If the electronic device determines to change the tuning code through the first measurement 801 and/or the second measurement 803, the electronic device may change the tuning code after two periods (811). As an example, one period 800 may include two-time transmission time intervals (TTI) (about one second).

Figure 9:
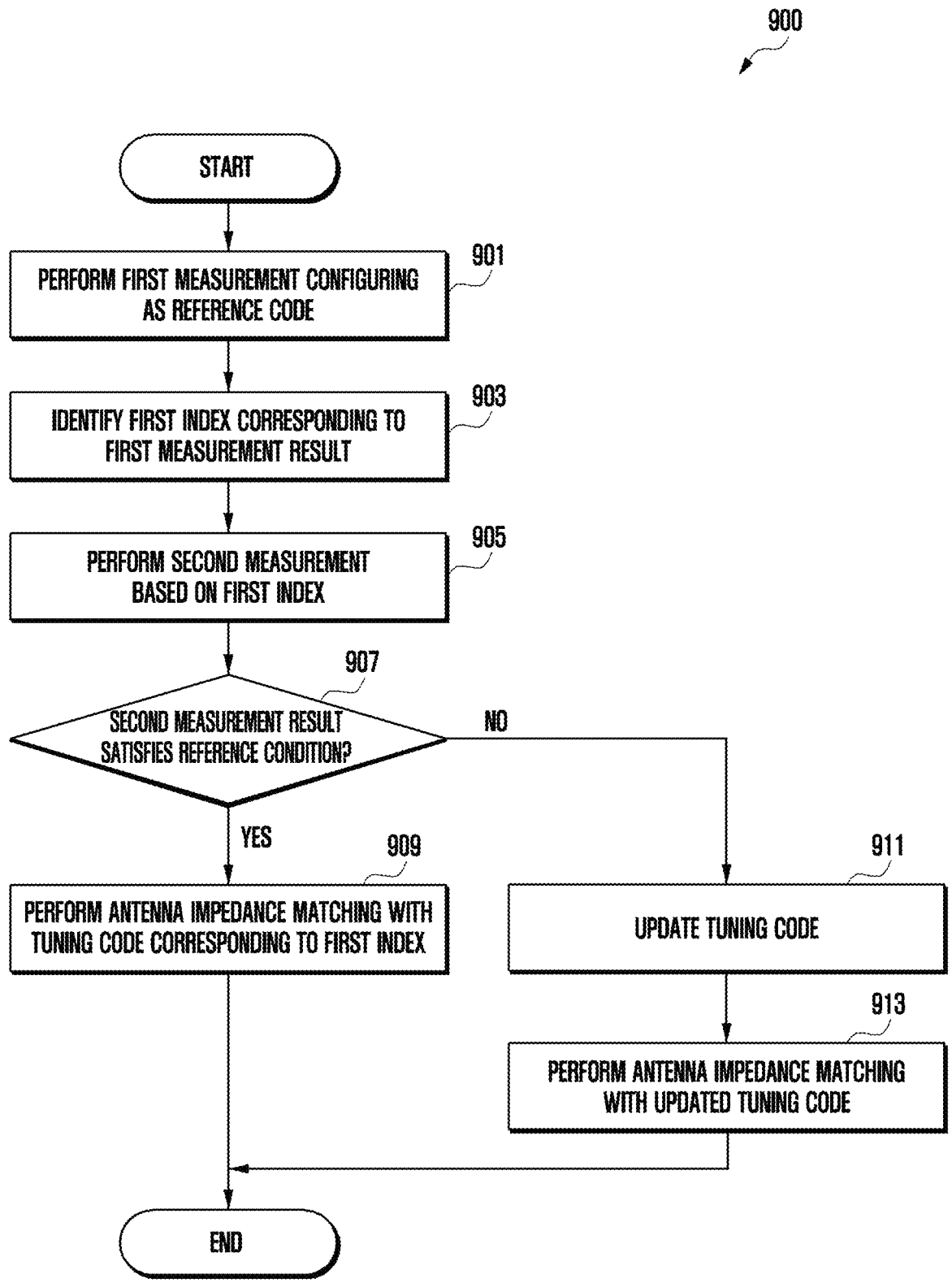
FIG. 9 is a flowchart in which an electronic device according to various embodiments updates a tuning code.

FIG. 9 is a flowchart 900 in which an electronic device according to various embodiments updates a tuning code. In the following embodiments, respective operations may be sequentially performed, but it may not be necessary that the operations are sequentially performed. For example, the order of the respective operations may be changed, or at least two of the operations may be performed in parallel. Here, the electronic device may be the electronic device 101 of FIG. 1 or the electronic device 200 of FIG. 2.

With reference to FIG. 9, according to various embodiments, the electronic device (e.g., processor 120 of FIG. 1 or processor 210 of FIG. 2), at operation 901, may identify the antenna impedance through the first measurement in a state where the tuning code for impedance matching is configured as the reference code. According to an embodiment, the processor 210 may perform the first measurement for identifying the change of the antenna impedance in a state where the tuning code of the impedance matching module 240 is configured as the reference code (e.g., bypass code).

According to various embodiments, at operation 903, the electronic device (e.g., processor 120 or 210) may identify the first index corresponding to the antenna impedance identified through the first measurement. According to an embodiment, as shown in FIG. 3B, the processor 210 may select any one index having the shortest distance to the antenna impedance identified through the first measurement among 96 sampled indexes as the first index.

According to various embodiments, at operation 905, the electronic device (e.g., processor 120 or 210) may perform the second measurement based on the tuning code and the ground code corresponding to the first index. According to an embodiment, the processor 210 may identify the antenna impedance by performing the second measurement in a state where the code of the impedance matching module 240 is configured as the tuning code corresponding to the first index and the code of the ground control module 250 is configured as the ground code corresponding to the first index. As an example, the second measurement may be performed in the same period as or in the next period to the period of the first measurement performed at operation 901. The second measurement may be performed in a state where the first index identified through the first measurement is equally maintained. As an example, the ground code corresponding to the first index may include a ground code having the highest priority among at least one ground code defined in the use environment in which the first index is included.

According to various embodiments, at operation 907, the electronic device (e.g., processor 120 or 210) may identify whether the result of the second measurement satisfies the reference condition related to the antenna impedance matching. According to an embodiment, the processor 210 may identify whether the distance between the antenna impedance identified through the second measurement and at least one reference impedance is equal to or shorter than the reference distance. As an example, if G0 400 and G1 410 are configured as reference impedances as shown in FIG. 4, the processor 210 may compare an average of the antenna impedance as the result of the second measurement and the distance between the G0 400 and G1 410 with the reference distance. As an example, in case of applying the tuning code corresponding to the index, the reference distance may be configured as a distance capable of including at least one index being determined so that the antenna impedance matches at least one reference impedance.

According to various embodiments, at operation 909, the electronic device (e.g., processor 120 or 210 and/or impedance matching module 240) may match the antenna impedance with the tuning code corresponding to the first index in case that the result of the second measurement based on the first index is determined to satisfy the reference condition related to the antenna impedance matching (e.g., "Yes" of operation 907). According to an embodiment, if the distance between the antenna impedance identified through the second measurement based on the first index and the at least one reference impedance is equal to or shorter than the reference distance, the processor 210 may determine that the result of the second measurement based on the first index satisfies the reference condition related to the antenna impedance matching. Accordingly, the processor 210 may select the tuning code and the ground code corresponding to the first index as variables for matching the antenna impedance. According to an embodiment, the impedance matching module 240 may adjust the electrical length between the antenna 260 and the wireless communication module 220 so that the antenna impedance matches the reference impedance based on the tuning code corresponding to the first index selected by the processor 210. According to an embodiment, the ground control module 250 may adjust the electrical length between the antenna 260 and the ground based on the ground code corresponding to the first index selected by the processor 210.

According to various embodiments, if it is determined that the result of the second measurement based on the first index does not satisfy the reference condition related to the antenna impedance matching (e.g., "No" of operation 907), the electronic device (e.g., processor 120 or 210), at operation 911, may update the tuning code for matching the antenna impedance based on the additional second measurement. According to an embodiment, if the distance between the antenna impedance identified through the second measurement based on the first index and the at least one reference impedance exceeds the reference distance, the processor 210 may determine that the result of the second measurement based on the first index does not satisfy the reference condition related to the antenna impedance matching. If the next period arrives, the processor 210 may determine the tuning code to be applied to the impedance matching module 240 for matching the antenna impedance through the additional second measurement. As an example, the additional second measurement may include the configuration to identify the antenna impedance in a state where the tuning code of the impedance matching module 240 is configured as the reference code and the ground code of the ground control module 250 is configured as the ground code corresponding to the first index. As an example, the additional second measurement may be performed in case that the first index obtained through the first measurement in the next period is equal to the first index identified in the previous period.

According to various embodiments, at operation 913, the electronic device (e.g., processor 120 or 210) may match the antenna impedance with the tuning code updated based on the additional second measurement. According to an embodiment, the processor 210 may select the second index corresponding to the antenna impedance identified through the additional second measurement. The processor 210 may select the tuning code predefined in the second index as the tuning code for matching the antenna impedance. The impedance matching module 240 may adjust the electrical length between the antenna 260 and the wireless communication module 220 so that the antenna impedance matches the reference impedance based on the tuning code corresponding to the second index selected by the processor 210. According to an embodiment, the ground control module 250 may adjust the electrical length between the antenna 260 and the ground based on the ground code corresponding to the first index selected by the processor 210. As an example, the ground code corresponding to the first index selected by the processor 210 may be determined based on the result of the second measurement to which at least one ground code defined in the use environment including the first index is applied.

Figure 10:
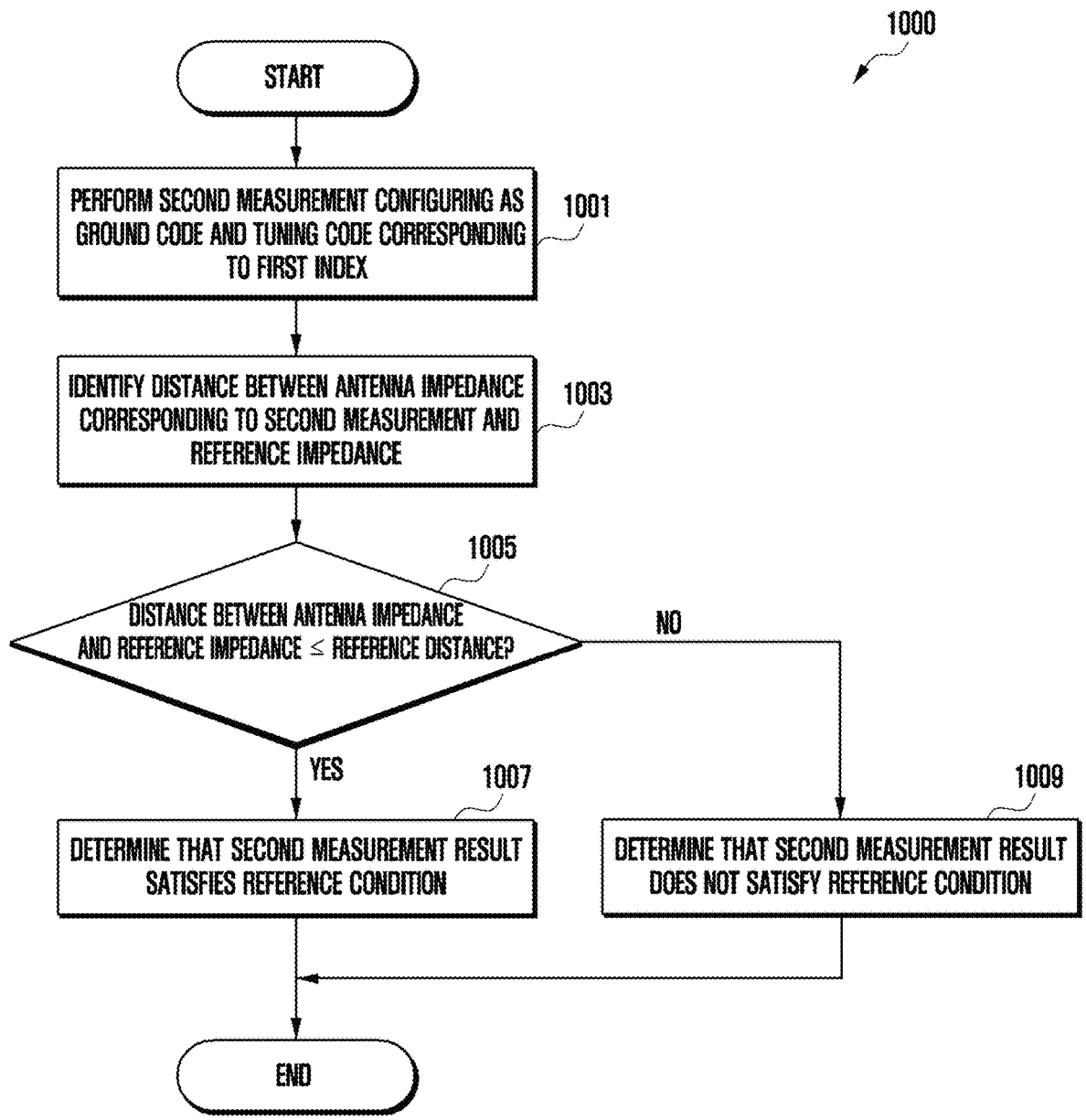
FIG. 10 is a flowchart in which an electronic device according to various embodiments determines whether to use a tuning code corresponding to a first measurement.

FIG. 10 is a flowchart 1000 in which an electronic device according to various embodiments determines whether to use a tuning code corresponding to a first measurement. Operations of FIG. 10 to be described hereinafter may be detailed operations of the operations 905 to 907 of FIG. 9. In the following embodiments, the respective operations may be sequentially performed, but it may not be necessary that the operations are sequentially performed. For example, the order of the respective operations may be changed, or at least two of the operations may be performed in parallel. Here, the electronic device may be the electronic device 101 of FIG. 1 or the electronic device 200 of FIG. 2.

With reference to FIG. 10, according to various embodiments, the electronic device (e.g., processor 120 of FIG. 1 or processor 210 of FIG. 2), at operation 1001, may perform the second measurement configured as the ground code and the tuning code corresponding to the first index in case that the first index corresponding to the antenna impedance identified through the first measurement is identified (e.g., operation 903 of FIG. 9). According to an embodiment, the processor 210 may perform the second measurement based on the first index in the same period as the period of the first measurement performed at operation 901 of FIG. 9. According to another embodiment, the processor 210 may perform the second measurement based on the first index in the next period of the first measurement performed at operation 901 of FIG. 9. The second measurement based on the first index may be performed in case that the first index of the first measurement in the next period is equal to the first index of the first measurement in the previous period. As an example, the ground code corresponding to the first index may include a ground code having the highest priority among at least one ground code defined in the use environment in which the first index is included.

According to various embodiments, at operation 1003, the electronic device (e.g., processor 120 or 210) may identify the distance between the antenna impedance identified through the second measurement and at least one reference impedance. According to an embodiment, if two reference impedances 400 and 410 are configured as shown in FIG. 4, the processor 210 may calculate an average of the antenna impedance identified through the second measurement and the distance between G0 400 and G1 410.

According to various embodiments, at operation 1005, the electronic device (e.g., processor 120 or 210) may identify whether the distance between the antenna impedance and the reference impedance is equal to or shorter than the reference distance. As an example, the reference distance may be configured as a distance capable of including at least one index being determined so that the antenna impedance adjusted by applying the tuning code corresponding to the index matches at least one reference impedance.

According to various embodiments, at operation 1007, the electronic device (e.g., processor 120 or 210) may determine that the result of the second measurement based on the first index satisfies the reference condition related to the antenna impedance matching in case that the distance between the antenna impedance and the reference impedance is equal to or shorter than the reference distance (e.g., "Yes" of operation 1005). According to an embodiment, if it is determined that the result of the second measurement based on the first index satisfies the reference condition related to the antenna impedance matching, the processor 210 may match the antenna impedance based on the tuning code corresponding to the first index as at operation 909 of FIG. 9.

According to various embodiments, if the distance between the antenna impedance and the reference impedance exceeds the reference distance (e.g., "No" of operation 1005), the electronic device (e.g., processor 120 or 210), at operation 1009, may determine that the result of the second measurement based on the first index does not satisfy the reference condition related to the antenna impedance matching. According to an embodiment, if it is determined that the result of the second measurement based on the first index does not satisfy the reference condition related to the antenna impedance matching, the processor 210 may match the antenna impedance based on the tuning code updated based on the additional second measurement as at operations 911 to 913 of FIG. 9.

Figure 11:
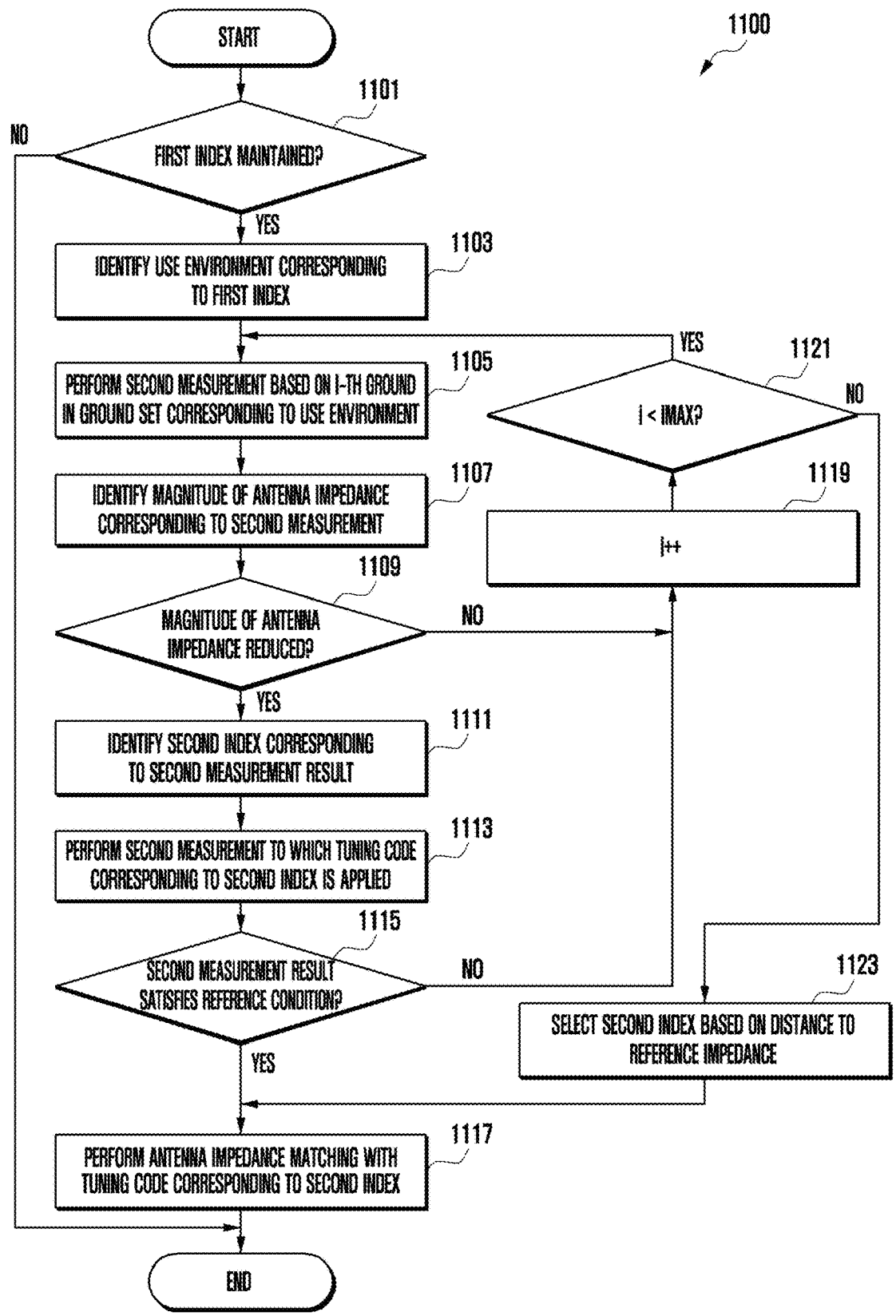
FIG. 11 is a flowchart in which an electronic device according to various embodiments selects a tuning code through a second measurement.

FIG. 11 is a flowchart 1100 in which an electronic device according to various embodiments selects a tuning code through a second measurement. Operations of FIG. 11 to be described hereinafter may be detailed operations of the operations 911 to 913 of FIG. 9. In the following embodiments, the respective operations may be sequentially performed, but it may not be necessary that the operations are sequentially performed. For example, the order of the respective operations may be changed, or at least two of the operations may be performed in parallel. Here, the electronic device may be the electronic device 101 of FIG. 1 or the electronic device 200 of FIG. 2.

With reference to FIG. 11, according to various embodiments, the electronic device (e.g., processor 120 of FIG. 1 or processor 210 of FIG. 2), at operation 1101, may identify whether the first index corresponding to the antenna impedance through the first measurement is maintained if it is determined that the result of the second measurement based on the first index does not satisfy the reference condition (e.g., "No" of operation 907 of FIG. 9). According to an embodiment, if the k-th period for measuring the antenna impedance arrives, the processor 210 may identify the antenna impedance through the first measurement. The processor 210 may identify whether the first index corresponding to the antenna impedance identified through the first measurement is equal to the first index obtained through the first measurement in the (k−1)-th period (i.e., previous period).

According to various embodiments, if the first index is changed (e.g., "No" of operation 1101), the electronic device (e.g., processor 120 or 210) may determine that the update of the tuning code is unnecessary. According to an embodiment, if the first index is changed, the processor 210 may determine whether to use the tuning code corresponding to the first index through the second measurement based on the first index as at operations 905 to 913 of FIG. 9.

According to various embodiments, at operation 1103, the electronic device (e.g., processor 120 or 210) may identify the use environment corresponding to the first index if the first index is maintained (e.g., "Yes" of operation 1101). According to an embodiment, 96 sampled indexes may be divided into a plurality of areas 702, 704, 706, 708, and 710 corresponding to the use environment as shown in FIG. 7. Accordingly, the processor 210 may identify the use environment of the electronic device 200 including the first index.

According to various embodiment, at operation 1105, the electronic device (e.g., processor 120 or 210) may perform the second measurement based on the i-th ground code in a ground set corresponding to the use environment of the electronic device 200. According to an embodiment, each of the areas 702, 704, 706, 708, and 710 corresponding to the use environment may define at least one ground code corresponding to the user environment. The processor 210 may perform the second measurement in a state where the code of the ground control module 250 is configured as the i-th ground code in the ground set including at least one ground code corresponding to the use environment of the electronic device 200. As an example, "i" is the priority of the ground code included in the ground set, and may be defined as a natural number. As an example, the second measurement may be performed in a state where the impedance matching module 240 is configured as the reference code. As an example, the second measurement being performed in a state where the code of the impedance matching module 240 is configured as the reference code and the code of the ground control module 250 is configured as the ground code corresponding to the use environment may be called the additional second measurement.

According to various embodiments, at operation 1107, the electronic device (e.g., processor 120 or 210) may identify the magnitude of the antenna impedance identified through the second measurement. According to an embodiment, the 96 sampled indexes may include magnitude values of 0.2, 0.4, 0.6, 0.8, and 1.0 configured based on the distance to at least one reference impedance as shown in FIG. 3B. The processor 210 may identify the magnitude of the antenna impedance based on inphase (I)/quadrature phase (Q) information of the antenna impedance identified through the second measurement.

According to various embodiments, at operation 1109, the electronic device (e.g., processor 120 or 210) may identify whether the magnitude of the antenna impedance identified through the second measurement is reduced. According to an embodiment, the processor 210 may identify whether the magnitude of the antenna impedance obtained through the second measurement based on the i-th ground code is smaller than the reference magnitude. As an example, the reference magnitude may be configured as the magnitude of the antenna impedance obtained through the second measurement based on the previous (e.g., (i−1)-th) ground code, and as an initial value, the magnitude of the antenna impedance obtained through the second measurement performed at operation 905 of FIG. 9 may be configured.

According to various embodiments, if the magnitude of the antenna impedance identified through the second measurement is reduced (e.g., "Yes" of operation 1109), the electronic device (e.g., processor 120 or 210), at operation 1111, may identify the second index corresponding to the result of the second measurement. According to an embodiment, the processor 210 may select the index having the shortest distance to the antenna impedance identified through the second measurement among the plurality of (e.g., 96) sampled indexes as the second index.

According to various embodiments, at operation 1113, the electronic device (e.g., processor 120 or 210) may perform the second measurement based on the tuning code corresponding to the second index and the i-th ground code. According to an embodiment, if the (k+2)-th period arrives, the processor 210 may identify whether the first index is maintained through the first measurement. If the first index is maintained, the processor 210 may identify the antenna impedance by performing the second measurement in a state where the code of the impedance matching module 240 is configured as the tuning code corresponding to the second index and the code of the ground control module 250 is configured as the i-th ground code.

According to various embodiments, at operation 1115, the electronic device (e.g., processor 120 or 210) may identify whether the result of the second measurement satisfies the reference condition related to the antenna impedance matching. According to an embodiment, the processor 210 may identify whether the distance between the antenna impedance identified through the second measurement and the at least one reference impedance is equal to or shorter than the reference distance. As an example, the at least one reference impedance may include at least one of G0 400 or G1 410 as shown in FIG. 4.

According to various embodiments, if it is determined that the result of the second measurement satisfies the reference condition related to the antenna impedance matching (e.g., "Yes" of operation 1115), the electronic device (e.g., processor 120 or 210 and/or impedance matching module 240), at operation 1117, may match the antenna impedance with the tuning code corresponding to the second index. According to an embodiment, if the distance between the antenna impedance identified through the second measurement and the at least one reference impedance is equal to or shorter than the reference distance, the processor 210 may determine that the result of the second measurement satisfies the reference condition related to the antenna impedance matching. Accordingly, the processor 210 may select the tuning code and the i-th ground code corresponding to the second index as variables for matching the antenna impedance. The impedance matching module 240 may adjust the antenna impedance based on the tuning code corresponding to the second index selected by the processor 210. The ground control module 250 may adjust the length of the ground related to resonance of the antenna 260 based on the i-th ground code selected by the processor 210.

According to various embodiments, if it is determined that the magnitude of the antenna impedance identified through the second measurement is not reduced (e.g., "No" of operation 1109) or the result of the second measurement does not satisfy the reference condition related to the antenna impedance matching (e.g., "No" of operation 1115), the electronic device (e.g., processor 120 or 210), at operation 1119, may update the i that indicates the priority of the ground code. As an example, the i may be increased by one step (i++).

According to various embodiments, at operation 1121, the electronic device (e.g., processor 120 or 210) may identify whether the updated i is equal to or smaller than the maximum value $i_{MAX}$. As an example, the maximum value of i may be configures as the number of ground codes included in a ground set corresponding to the use environment of the electronic device 200.

According to various embodiments, if the updated i is equal to or smaller than the maximum value $i_{MAX}$ of the i (e.g., "Yes" of operation 1121), the electronic device (e.g., processor 120 or 210) may proceed with operation 1105, and may perform the second measurement based on the ground code corresponding to the updated i.

According to various embodiments, if the updated i exceeds the maximum value $i_{MAX}$ of the i (e.g., "No" of operation 1121), the electronic device (e.g., processor 120 or 210), at operation 1123, may select the second index based on the antenna impedance having the shortest distance to the reference impedance among the antenna impedances identified through the second measurement in a state where the respective codes are configured as the ground codes. As an example, if a plurality of reference impedances are provided, the distance to the reference impedance may include an average of the distances between the respective reference impedances and the antenna impedances.

According to various embodiments, if the second index is selected based on the distance to the reference impedance at operation 1117 (e.g., operation 1123), the electronic device (e.g., processor 120 or 210 and/or impedance matching module 240) may match the antenna impedance with the tuning code corresponding to the second index.

According to various embodiments, the electronic device may configure the tuning code and the ground code related to the antenna impedance matching through the second measurement in a state where the first index corresponding to the result of the first measurement is maintained. According to an embodiment, if the first index corresponding to the result of the first measurement is changed, the electronic device may determine the tuning code for matching the antenna impedance through operations 901 to 913 of FIG. 9.

According to various embodiments, in case of updating at least one of the tuning code or the ground code based on the second measurement, the electronic device may update at least one of the tuning code or the ground code defined in the first index corresponding to the result of the first measurement with the tuning code or the i-th ground code corresponding to the second index.

Figure 12:
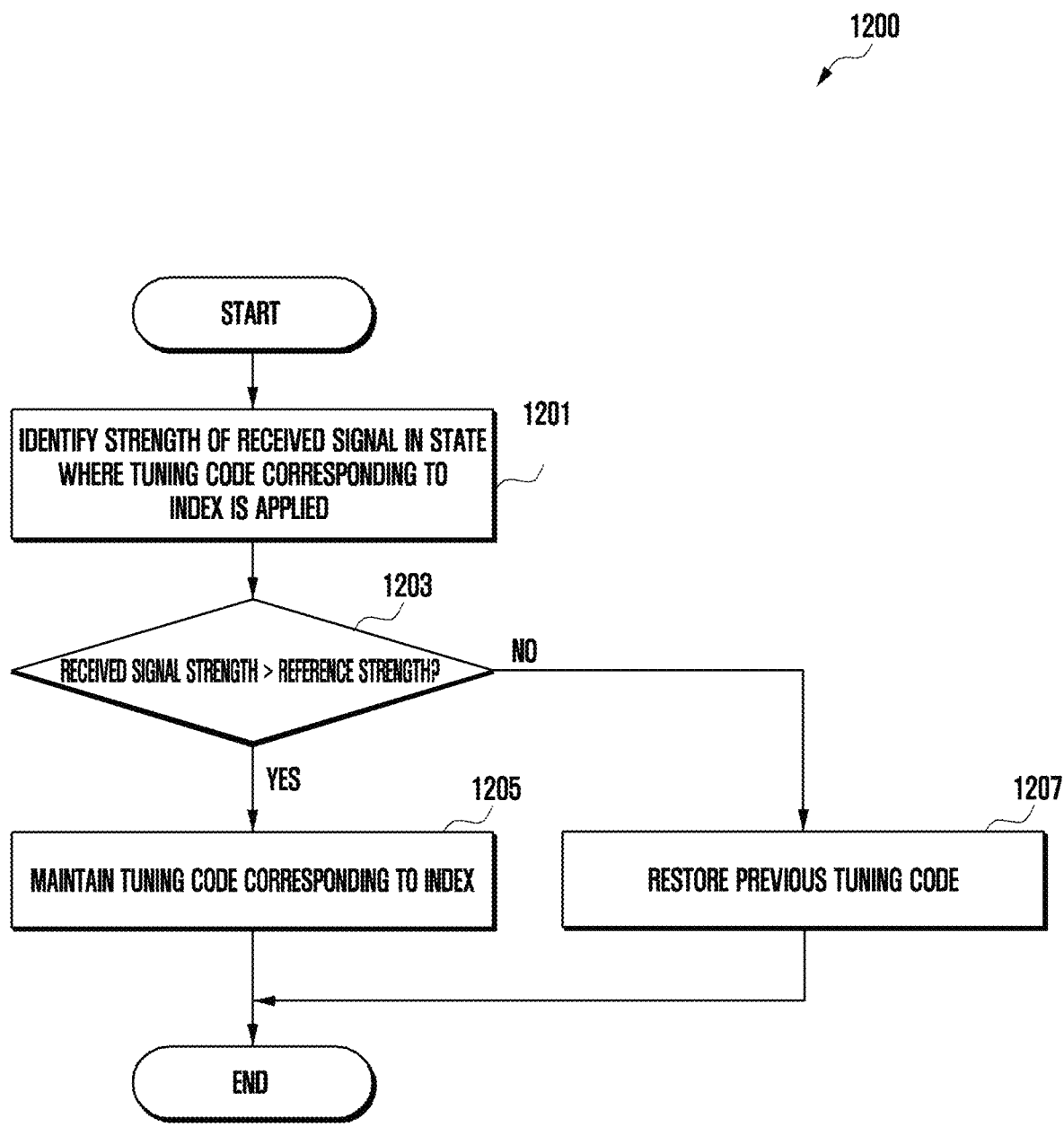
FIG. 12 is a flowchart in which an electronic device according to various embodiments configures a tuning code based on a received signal strength.

FIG. 12 is a flowchart in which an electronic device according to various embodiments configures a tuning code based on a received signal strength. Operations of FIG. 12 to be described hereinafter may be detailed operations of the operation 909 of FIG. 9 or the operation 1117 of FIG. 11. In the following embodiments, the respective operations may be sequentially performed, but it may not be necessary that the operations are sequentially performed. For example, the order of the respective operations may be changed, or at least two of the operations may be performed in parallel. Here, the electronic device may be the electronic device 101 of FIG. 1.

With reference to FIG. 12, according to various embodiments, the electronic device (e.g., processor 120 of FIG. 1 or processor 210 of FIG. 2), at operation 1201, may identify the strength of a received signal in a state where the tuning code corresponding to the first index corresponding to the result of the first measurement or the second index corresponding to the result of the second measurement is applied. According to an embodiment, if it is determined that the result of the second measurement based on the first index satisfies the reference condition related to the antenna impedance matching (e.g., "Yes" of operation 907 of FIG. 9), the processor 210 may identify the strength of the received signal in the state where the tuning code predefined in the first index is applied to the impedance matching module 240. According to an embodiment, if it is determined that the result of the additional second measurement satisfies the reference condition related to the antenna impedance matching (e.g., "Yes" of operation 1115 of FIG. 11), the processor 210 may identify the strength of the received signal in the state where the tuning code predefined in the second index is applied to the impedance matching module 240. As an example, the strength of the received signal may include at least one of a received signal strength indication (RSSI), a reference signal received power (RSRP), or a reference signal received quality (RSRQ).

According to various embodiments, at operation 1203, the electronic device (e.g., processor 120 or 210) may identify whether the identified strength of the received signal is larger than the reference strength in the state where the tuning code corresponding to the index is applied. As an example, the reference strength may include the strength of the received signal measured before changing the tuning code to the tuning code corresponding to the index.

According to various embodiments, if the identified strength of the received signal is larger than the reference strength in the state where the tuning code corresponding to the index is applied (e.g., "Yes" of operation 1203), the electronic device (e.g., processor 120 or 210), at operation 1205, may maintain the tuning code corresponding to the index. According to an embodiment, if the identified strength of the received signal is larger than the reference strength in the state where the tuning code corresponding to the index is applied, the processor 210 may determine that the strength of the received signal is improved through the antenna impedance matching based on the corresponding tuning code. Accordingly, the processor 210 may control to maintain the tuning code of the impedance matching module 240 with the tuning code corresponding to the index.

According to various embodiments, if the identified strength of the received signal is equal to or smaller than the reference strength (e.g., "No" of operation 1203) in the state where the tuning code corresponding to the index is applied, the electronic device (e.g., processor 120 or 210), at operation 1205, may restore the tuning code for matching the antenna impedance to the tuning code used before changing the tuning code (i.e., previous tuning code). According to an embodiment, if the identified strength of the received signal is equal to or smaller than the reference strength in the state where the tuning code corresponding to the index is applied, the processor 210 may determine that the strength of the received signal is not improved through matching of the antenna impedance based on the corresponding tuning code. Accordingly, the processor 210 may change the tuning code of the impedance matching module 240 to the tuning code used before changing to the tuning code corresponding to the index.

According to various embodiments, a method for operating an electronic device (e.g., electronic device 101 of FIG. 1 or electronic device 200 of FIG. 2) may include: selecting a first index corresponding to an impedance of an antenna among a plurality of sampled indexes through a first measurement in which a tuning code for impedance matching of the antenna is configured as a reference code; identifying a use environment corresponding to the first index; selecting a second index corresponding to the impedance of the antenna among the plurality of sampled indexes through a second measurement in which the tuning code for the impedance matching of the antenna is configured as the reference code and as a ground code corresponding to the use environment; and adjusting the impedance of the antenna based on a tuning code corresponding to the second index.

According to various embodiments, the plurality of sampled indexes may include 96 indexes corresponding to different impedances.

According to various embodiments, at least one adjacent index of the plurality of sampled indexes may be grouped by use environments.

According to various embodiments, the first measurement and the second measurement may be performed in a same period.

According to various embodiments, the method may further include adjusting a length of a ground connected to the antenna based on the ground code corresponding to the use environment.

According to various embodiments, a method for operating an electronic device (e.g., electronic device 101 of FIG. 1 or electronic device 200 of FIG. 2) may include: selecting a first index corresponding to a first impedance of an antenna identified through a first measurement, in which a tuning code for impedance matching of the antenna is configured as a reference code, among a plurality of sampled indexes; identifying a use environment corresponding to the first index; identifying a second impedance of the antenna through a second measurement in which the tuning code for the impedance matching of the antenna is configured as a tuning code corresponding to the first index and as a ground code corresponding to the use environment; and adjusting the impedance of the antenna based on the tuning code corresponding to the first index in case that a distance between the second impedance and a reference impedance satisfies a designated condition.

According to various embodiments, wherein the plurality of sampled indexes may include 96 indexes corresponding to different impedances, and at least one adjacent index of the plurality of sampled indexes may be grouped by use environments.

According to various embodiments, the method may further includes: updating the tuning code based on a result of the second measurement in which the tuning code of the impedance matching module is configured as the reference code and as the ground code corresponding to the use environment in case that the distance between the second impedance and the reference impedance does not satisfy the designated condition; and adjusting the impedance of the antenna based on the updated tuning code.

According to various embodiments, the method may further include adjusting a length of a ground connected to the antenna based on the ground code corresponding to the use environment.

According to various embodiments, the reference impedance may include at least one of inphase (I)/quadrature (Q) information corresponding to 50 ohms or I/Q information having a highest transmission power.

According to various embodiments of the disclosure, the electronic device can select the optimum tuning code for matching the antenna impedance by selecting the tuning code for matching the antenna impedance based on the ground code corresponding to the use environment of the electronic device through the first measurement for identifying the antenna impedance and the second measurement for updating the tuning code.

According to various embodiments of the disclosure, the electronic device can select the optimum tuning code for matching the antenna impedance corresponding to the use environment of the electronic device by configuring a plurality of (e.g., two) reference impedances for matching the antenna impedance based on the transmission power.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   an antenna;
   a wireless communication circuitry;
   an impedance matching circuitry electrically connected to the antenna and the wireless communication circuitry; and
   at least one processor operatively connected to the impedance matching circuitry and the wireless communication circuitry,
   wherein the at least one processor is configured to:
      identify a ground code corresponding to a use environment of the electronic device,
      select a first index corresponding to an impedance of the antenna among a plurality of sampled indexes through a first measurement in which a tuning code of the impedance matching circuitry is configured as a reference code and as the identified ground code corresponding to the use environment, and
      adjust the impedance of the antenna based on the tuning code corresponding to the first index.

2. The electronic device of claim 1, wherein the at least one processor is further configured to:
   select a second index corresponding to the impedance of the antenna among the plurality of sampled indexes through a second measurement in which the tuning code of the impedance matching circuitry is configured as the reference code, and
   identify the ground code corresponding to the use environment of the electronic device based on the selected second index.

3. The electronic device of claim 2, wherein at least one adjacent index of the plurality of sampled indexes is grouped by use environments.

4. The electronic device of claim 2, wherein the at least one processor is further configured to identify the impedance of the antenna through the first measurement and the second measurement in a same period.

5. The electronic device of claim 1, wherein the at least one processor is further configured to adjust a length of a ground connected to the antenna based on the ground code corresponding to the use environment.

6. An electronic device comprising:
an antenna;
a wireless communication circuitry;
an impedance matching circuitry electrically connected to the antenna and the wireless communication circuitry; and
at least one processor operatively connected to the impedance matching circuitry and the wireless communication circuitry,
wherein the at least one processor is configured to:
select a first index corresponding to a first impedance of the antenna identified through a first measurement in which a tuning code of the impedance matching circuitry is configured as a reference code among a plurality of sampled indexes,
identify a ground code corresponding to the first index,
identify a second impedance of the antenna through a second measurement in which the tuning code of the impedance matching circuitry is configured as a tuning code corresponding to the first index and as the identified ground code, and
adjust an impedance of the antenna based on the tuning code corresponding to the first index in case that a distance between the second impedance and a reference impedance satisfies a designated condition.

7. The electronic device of claim 6, wherein the plurality of sampled indexes comprise 96 indexes each of which corresponds to different impedance.

8. The electronic device of claim 6, wherein the at least one processor is configured to:
update the tuning code based on a result of a third measurement in which the tuning code of the impedance matching circuitry is configured as the reference code and as the identified ground code in case that the distance between the second impedance and the reference impedance does not satisfy the designated condition, and
adjust the impedance of the antenna based on the updated tuning code.

9. The electronic device of claim 6, wherein the at least one processor is further configured to adjust a length of a ground connected to the antenna based on the identified ground code.

10. The electronic device of claim 6, wherein the reference impedance comprises at least one of inphase (I)/quadrature (Q) information corresponding to 50 ohms or I/Q information including a highest transmission power.

11. A method for operating an electronic device comprising:
identifying a ground code corresponding to a use environment of the electronic device;
selecting a first index corresponding to an impedance of an antenna of the electronic device among a plurality of sampled indexes through a first measurement in which a tuning code for impedance matching of the antenna is configured as a reference code and as the identified ground code corresponding to the use environment; and
adjusting the impedance of the antenna based on the tuning code corresponding to the first index.

12. The method of claim 11, wherein the identifying the ground code corresponding to the use environment of the electronic device comprising:
selecting a second index corresponding to the impedance of the antenna among the plurality of sampled indexes through a second measurement in which the tuning code of the impedance matching of the antenna is configured as the reference code, and
identifying the ground code corresponding to the use environment of the electronic device based on the selected second index.

13. The method of claim 12, wherein at least one adjacent index of the plurality of sampled indexes is grouped by use environments.

14. The method of claim 12, wherein the first measurement and the second measurement are performed to identify the impedance of the antenna in a same period.

15. The method of claim 11, further comprising adjusting a length of a ground connected to the antenna based on the ground code corresponding to the use environment.

16. A method for operating an electronic device comprising:
selecting a first index corresponding to a first impedance of an antenna identified through a first measurement in which a tuning code for impedance matching of the antenna is configured as a reference code among a plurality of sampled indexes;
identifying a ground code corresponding to the first index;
identifying a second impedance of the antenna through a second measurement in which the tuning code for the impedance matching of the antenna is configured as a tuning code corresponding to the first index and as the identified ground code; and
adjusting the impedance of the antenna based on the tuning code corresponding to the first index in case that a distance between the second impedance and a reference impedance satisfies a designated condition.

17. The method of claim 16, wherein the plurality of sampled indexes comprise 96 indexes each of which corresponds to different impedance.

18. The method of claim 16, further comprising:
updating the tuning code based on a result of a third measurement in which the tuning code of the impedance matching of the antenna is configured as the reference code and as the identified ground code in case that the distance between the second impedance and the reference impedance does not satisfy the designated condition; and
adjusting the impedance of the antenna based on the updated tuning code.

19. The method of claim 16, further comprising adjusting a length of a ground connected to the antenna based on the identified ground code.

20. The method of claim 16, wherein the reference impedance comprises at least one of inphase (I)/quadrature (Q) information corresponding to 50 ohms or I/Q information including a highest transmission power.

* * * * *